Sept. 12, 1967  M. N. JANAPOL  3,340,548
BEDDING PRESCRIPTION APPARATUS
Filed Oct. 1, 1965  2 Sheets-Sheet 1
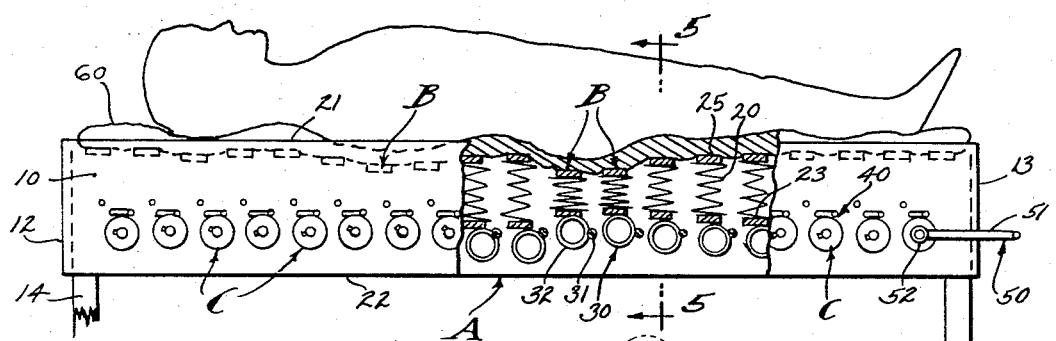
FIG. 1.
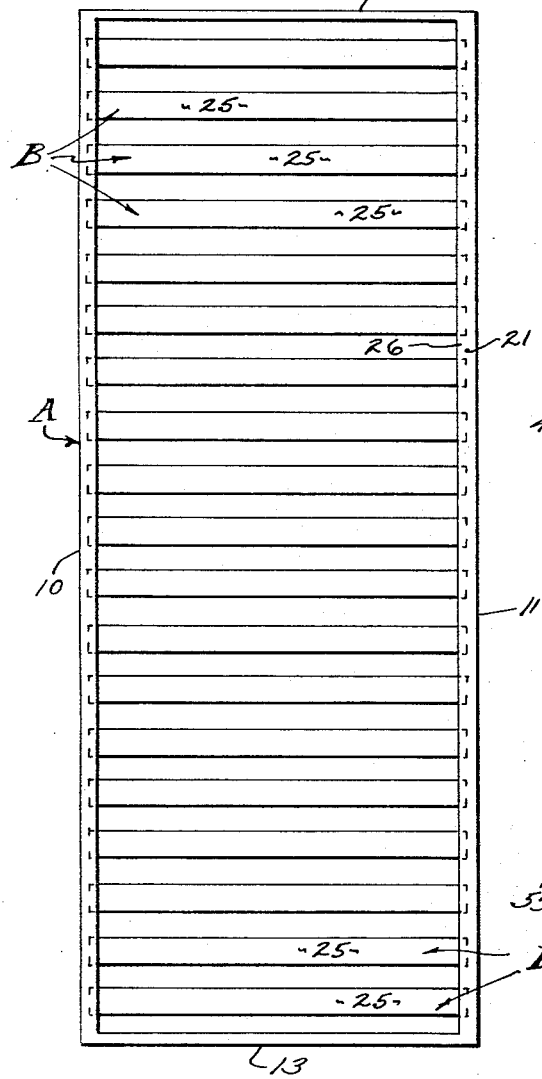
FIG. 2.
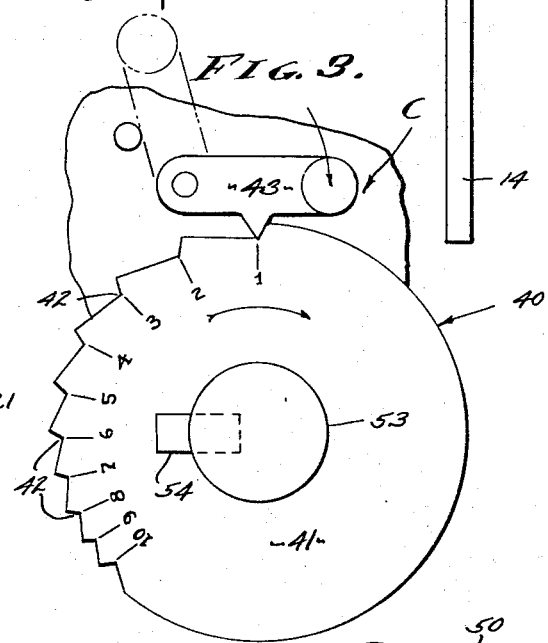
FIG. 3.
FIG. 4.
INVENTOR.
MELVIN N. JANAPOL
BY
AGENT Sept. 12, 1967 M. N. JANAPOL 3,340,548
BEDDING PRESCRIPTION APPARATUS
Filed Oct. 1, 1965 2 Sheets-Sheet 2

INVENTOR.
MELVIN N. JANAPOL
BY
AGENT

United States Patent Office 3,340,548
Patented Sept. 12, 1967

3,340,548
BEDDING PRESCRIPTION APPARATUS
Melvin N. Janapol, Los Angeles, Calif., assignor to Wortso Corporation, Los Angeles, Calif., a corporation of California
Filed Oct. 1, 1965, Ser. No. 491,906
6 Claims. (Cl. 5—243)

ABSTRACT OF THE DISCLOSURE

This invention relates to bedding and is particularly concerned with prescribing firmness in certain areas of mattresses and the like to be constructed as prescribed by doctors qualified to diagnose and make said requirements relating to individual persons for which the bedding is intended. More particularly, the invention is concerned with apparatus for the prescription of box springs or the like, used for underlying support beneath a mattress upon which the person is to lie. And relates broadly to the prescribing of any furniture upon which a person is to rest or lie.

---

Figure 5:
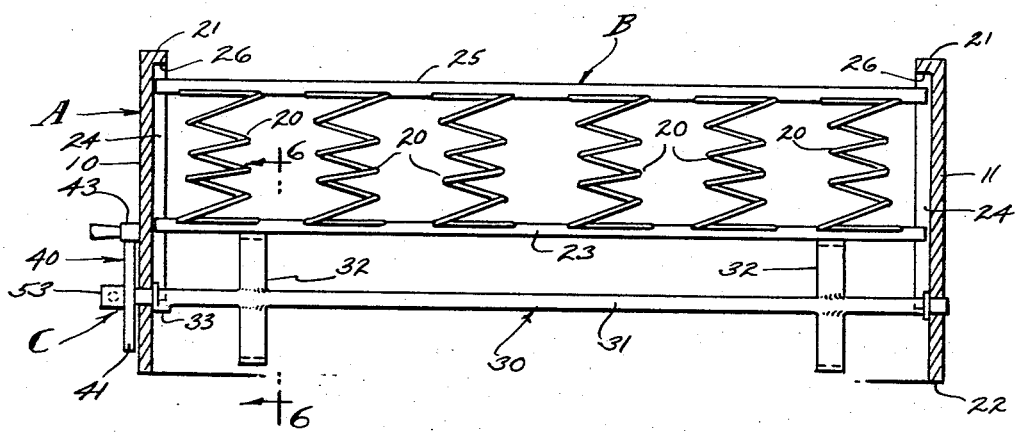

The prescription apparatus hereinafter disclosed is suited for and intended to determine with accuracy the applied pressures and resultant heights at the rows of spring of Prescription Bedding Having Individually Adjustable Spring Units as disclosed in Patent No. 3,126,554 issued to me Mar. 31, 1964.

Variable pressures and heights of support are required at different areas of mattresses, as related to the individual requirements of persons. For example, box springs or mattresses are constructed with graduated applied pressures throughout the length of an individual person's body, and these box springs or mattresses are characterized by means to select and/or vary the spring pressures that provide the support for the person involved. Such a bedding is said to have adjustable firmness and is intended to meet the requirements of a particular person. That is, the different areas of the box spring or mattress are to be constructed with prescribed capabilities for applying support pressure and to the end that the different surface areas seek a predetermined height when the person prescribed for rests or lies thereupon. Therefore, it is an object of this invention to provide a scientific approach to prescribing bedding that is constructed to an individual person's requirements, and specifically to diagnose with accuracy certain spring pressures which are inherently necessary to hold said individual in a proper and determinable posture.

Because the stature of the human form is characterized by curvatures that vary from person to person and which also may be a result of injuries or defects, it is not possible to construct a single bedding unit suitable for all. Each individual person requires distinctive support, especially when that individual is afflicted with some disorder or injury to his person. Although various reclining positions are possible, for purpose of illustration a normal reclining posture of rest upon the back or posterior is to be considered. However, the same general support requirements will prevail for a given person even upon departure from said illustrated position, giving substantial latitude for permitting variations in posture.

A general object of the invention is to provide an apparatus whereby the required spring pressures at different specified areas of bedding can be determined and prescribed accurately for use in constructing bedding that will conform precisely with a prescription. With the present invention the conditions existing at a mattress or the like, are simulated in an apparatus which is adjustable and which indicates the pressures applied for support at different specified areas.

It is an object of this invention to provide an apparatus of the character referred to adapted to prescribe spring support in bedding, which permits an observation of posture, and which simultaneously provides for the application of variable supporting forces so as to bring the individual person's posture into the desired alignment as circumstances require.

Another object of this invention is to provide an apparatus as hereinabove referred to and which indicates the pressures applied at different specified areas, so that records are readily established for the ultimate purpose of reconstructing the conditions existing at said apparatus, in a unit of bedding which is adapted to conform with the prescription and thereby to properly and or comfortably support the individual person involved.

Figure 6:
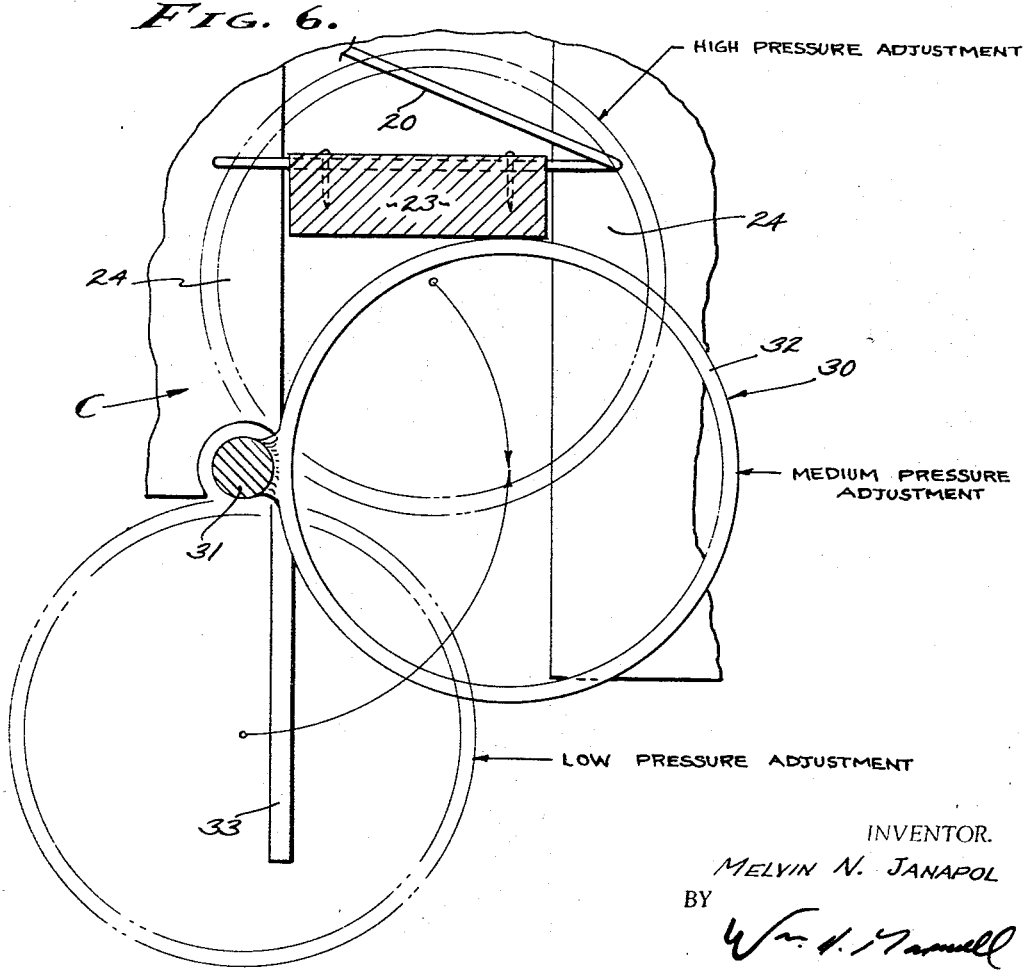

The various objects and features of this invention will be fully understood from the following detailed description of the typical preferred form and application thereof, throughout which description reference is made to the accompanying drawings in which:

FIG. 1 is a side elevation of the apparatus of the present invention, showing it in use and portions thereof broken away to show in section. FIG. 2 is an enlarged top plan view of the structure shown in FIG. 1. FIG. 3 is an enlarged detailed view of a portion of the apparatus shown in FIG. 1, and FIG. 4 is a detailed perspective view of the manually controlled element that is provided to adjust the apparatus. FIG. 5 is an enlarged transverse sectional view taken as indicated by line 5—5 on FIG. 1. FIG. 6 is an enlarged detailed view taken as indicated by line 6—6 on FIG. 5.

In the art of prescription bedding it has been found that recovery from injuries to the human body is aided by prescribing proper bedding or support for the injured person, and for other allied purposes. Hand in hand with the construction of prescribed bedding there is the want of means for uniformly making a diagnosis and for prescribing support pressure requirements in the different areas of the mattress, and to this end the present invention provides an apparatus that predicates a prescription upon actual gaging of the person's body while diagnosis is made relating to posture. More particularly, the apparatus involved can be referred to as a simulator, since supporting pressures are adjustably applied at different areas in order to bring the varying heights thereof to a desired and acceptable contour which thereby establishes a correct and or required posture. Therefore, and in accordance with the present invention, it is most practical to diagnose a person's orthopedic problems by analysis of his anatomy per se, by making support pressure determinations which will bring the person's body portions into a proper height alignment, and all of which is detected and transcribed for the purpose of reconstructing the same pressure determinations in a useful bedding unit.

In practice, bedding of the type under consideration takes the form of a mattress having transverse rows of spring coils which can be varied in their supporting function by initial design and by adjustment. Such bedding is available after the teaching of my above-mentioned patent and prescription data is necessary for the construction and or adjustments of the same. To this end therefore, the instant bedding prescription apparatus is a simulator that has elements corresponding in character and placement with corresponding elements found in the box springs or mattresses. For example, a typical bedding (not shown) comprises a plurality of transverse rows of spring coil supports. There are usually a half dozen, or more, of compression coil springs comprising each row, and the rows thereof are adjacently related one parallel to the other. A usual bedding unit has nineteen such rows, adjacent rows being interconnected, and the entire combination being covered by a pad or a mattress. It is a multi-row bedding unit of this type which the apparatus of the present invention simulates.

In the drawings I have shown a preferred embodiment of the present invention wherein there is, generally, a frame A, and plurality of pressure applying body support means B, and pressure adjustment means C for each of the support means B. Thus, the invention can be reduced to three general means that are cooperatively related to perform their functions as a mattress or box spring or bedding simulator. The first element, or means, is the frame A which serves as the structural support for the other two cooperatively related elements that simulate the usual transverse rows of spring coils. The second element, or means B, is in the form of a plurality of like depressible pressure applying supports that are arranged to correspond with the areas and placements of like rows of spring coils in a mattress, or box spring, or bedding. The third element, or means C, is in the form of a manual adjustment that varies the supporting pressures affected by each of the support means B and which indicates or displays the variations in pressure applied.

The first element of frame A that serves as the structural support can vary widely in detail of construction and is of a shape and of proportions to simulate a bed or hospital cot. In other words, the frame A is not necessarily the size of a conventional bed and is preferably narrow like a cot. However, the frame is of full length so as to accommodate persons of tall stature. Therefore, the frame A is an elongate rectangular structure and in accordance with the invention it comprises parallel side rails 10 and 11, a head 12 and a foot 13. The parts 10–13 are flat vertically disposed beam sections that are fixedly joined at right angularly related corners, so as to form a box-like construction. The assembled parts 10–13 are then disposed horizontally as a unit, as is a bed and in practice is supported by legs 14 that depend therefrom at each of the four corners. Thus, the frame A presents an elevated platform useful as a clinical table.

The second element or pressure applying body support means B are preferably alike and each simulates a row of spring support coils as in the mattress or bedding to be prescribed. Each support means B is a transversely disposed means that extends at a right angle between the rails 10 and 11, and/or parallel with the head 12 and foot 13. The means B can vary in form while serving the broad function of supplying a pressurized support at the top surface or top plane of the frame A. In the form of the invention illustrated, the support means B is similar to the row of spring coils which it is to simulate, and comprises a row of like spring coils 20 disposed on vertical axes between a top plane of the frame A coincidental with the top edges 21 of the rails 10 and 11 and bottom plane of the frame A coincidental with the bottom edges 22 of the rails 10 and 11.

In accordance with the invention, the row of coils 20 is carried for vertical movement on a platen 23 that spans between the side rails 10 and 11. The platen 23 is a stiff beam member that is guided at its opposite ends by blocks 24 fastened to the interior of the rails 10 and 11, to the end that said platen is restricted to vertical movement. The blocking 24 can also limit downward movement of the platen, as shown. Although the springs 20 can be tied and/or otherwise restricted so as to limit their extensibility, it is preferred that the row of spring coils 20 be restricted together by a single header 25. As clearly illustrated, the header 25, like the platen above described, is a stiff beam member that is guided at its opposite ends by the same blocks 24 and to the end that said header 25 is restricted to vertical movement. However, and in accordance with the invention, the spring coils 20 are yieldingly extensible to urge the header 25 upwardly, there being a stop 26 at each said rail to limit the elevation of the header 25 to the top plane of the frame A. The spring coils 20 are seated in or are fastened to the platen 23 and header 25, respectively, as is shown.

With the frame and support means structure thus far described a platform in the nature of a clinical table is provided, wherein the frame A embraces the plurality of slat-like pressure applying support means B. A feature of the present invention is that the said support means involves depressible headers 25 disposed transversely across the frame and each of which simulates an independent row of spring coils in the bedding structure to be prescribed. In carrying out the invention, the headers 25 are yieldingly urged, by the application of a minimum spring pressure, into engagement with the height limiting stops 26 when the platens 23 are stopped at their lower limits of travel. Thus, the structure normally presents a series of parallel headers 25 supported at the top plane of the frame A by means of light pressure applied by the substantially extended springs 20.

The third element or pressure adjustment means C are individually applicable to each of the support means B above described, to indicatively vary the support pressure applied beneath the individual headers 25. That is, there is an adjustment means C at each of the plurality of support means B, and as shown each means C is independently adjustable by selective manipulation, and each means C independently indicates the quantity of pressure applied. In accordance with the invention each means C is operative to selectively elevate a platen 23 and to thereby controllably increase the bias upon the springs 20 by compressing them as required. The means C, in its preferred form, involves means 30 to elevate the platen 23 in a horizontal disposition, means 40 to releasably secure the platen in the elevated position, and means 50 to selectively operate the means 30 to cause elevating of the platen 23. The means 30, 40 and 50 are cooperatively arranged within the frame A and are accessible in the exterior thereof for manual actuation.

The means 30 that elevates the platen is shown as a cam means and comprises a control shaft 31 and a pair of spaced cams 32, all of which underlies the platen 23. The control shaft 31 is a straight revolvable element that has its opposite ends journaled in the side rails 10 and 11, and on an axis offset to one side of the platen 23; offset to one side of the axes of the row of spring coils 20. The axis of shaft 31 is located at or just below the lowermost face of the platen 23 which is to be lifted. The cams 32 are widely spaced so as to have lifting engagement with the end portions of the platen 23, and they are in the form of identical circular rings secured to the control shaft 31 to extend therefrom in spaced radial planes normal to the axis of the shaft. The axes of the two circular cams 32 are aligned, and the cams are secured to the shaft as by welding. Thus, as the control shaft is revolved the circumferences of the cams 32 have sliding engagement with the underside of the platen 23 to increasingly lift the platen as the shaft 31 is revolved. The shaft and cam arrangement hereinabove described is effective through revolvement of the shaft 31 through more than 90° of rotation and somewhat less than 180°, there being a stop 33 to limit the travel to approximately 150° of rotation.

The means 40 that selectively secures the platen 23 in the elevated position is coupled to the control shaft 31 to releasably latch the same in any preselected incremental position within the range of adjustment above referred to. The means 40 is shown as an indicatively calibrated disk 41, having circumferential detents 42 incrementally positioned and each represented by suitable indicia, to indicate a quantity of bias pressure to be applied to the springs 20. Therefore, the detents 42 are graduated in spacing, so as to correspond with the parts of the particular springs that are employed. The means 40, being releasable, comprises a sear 43 that is manually operable to engage in or to be released from the detents 42. The sear 43 is weighted so as to remain in either of the two positions, one position engaged in a detent and one position out of engagement.

The means 50 that selectively operates the means 30 is a lever or the like that revolves the control shaft 31. Since the plurality means C are closely related lengthwise of the frame A, the means 50 therefore comprises a removable crank 51 with a hub 52 engageable over the projecting end 53 of any one of the control shafts 31 desired to be revolved, there being a drive pin 54 and notch 55 coupling for driving engagement.

From the foregoing it will be apparent that the headers 25 can be conveniently covered with a suitable pad 60 or the like, so as to comfortably support a reclining person. Diagnosis of the person's posture is arrived at by revolving the various control shafts 31, as circumstances require, so as to apply the supporting pressures necessary to establish the posture and body alignment desired, whereupon the incremental adjustments that have been made are observed and recorded for the purpose of constructing bedding having the identical pressure support quantities as determined by the bedding prescription apparatus hereinabove disclosed.

Having described my invention, I do not wish to be limited or restricted to the specific details herein set forth, but wish to reserve to myself any modifications or variations that appear to those skilled in the art and fall within the scope of the following claims:

Having described my invention, I claim:

1. A bedding prescription apparatus for determination of support pressure to be applied at the rows of springs of the bedding, and including:
    (a) a frame with side rails and open therebetween;
    (b) a pressure applying support means comprising, a stiff, vertically shiftable and depressible header simulating the placement and disposition of a row of springs and guided by and between the side rails of the frame, and a variable pressure means supporting the header;
    (c) and indicative adjustment means selectively varying the pressure means so as to elevate the header and overlying area and body of a person reclining on the apparatus.

2. A bedding prescription apparatus for determination of support pressure to be applied at the rows of springs of the bedding, and including:
    (a) a frame with side rails and open therebetween;
    (b) a pressure applying support means comprising, a stiff, vertically shiftable and depressible header simulating the placement and disposition of a row of said bedding springs and guided by and between the side rails of the frame, and a spring means supporting the header;
    (c) and indicative adjustment means selectively varying the spring means, so as to elevate the header and overlying area and body of a person reclining on the apparatus.

3. A bedding prescription apparatus for determination of support pressure to be applied at the rows of springs of the bedding, and including:
    (a) a frame with side rails and open therebetween;
    (b) a pressure applying support means comprising, a stiff, vertically shiftable and depressible header simulating the placement and disposition of a row of said bedding springs and guided by and between the side rails of the frame, and a row of spring coils supporting the header;
    (c) and indicative adjustment means selectively varying the row of springs coils, so as to elevate the header and overlying area and body of a person reclining on the apparatus.

4. A bedding prescription apparatus for determination of support pressure to be applied at the rows of springs of the bedding, and including:
    (a) a frame with side rails and open therebetween;
    (b) a pressure applying support means comprising, a stiff, vertically shiftable and depressible header simulating the placement and disposition of a row of said bedding springs and guided by and between the side rails of the frame, and a spring means supporting the header;
    (c) and indicative adjustment means comprising a vertically moveable platen lifted beneath the spring means, varying the pressure of the spring means so as to elevate the header and overlying area and body of a person reclining on the apparatus.

5. A bedding prescription apparatus for determination of support pressure to be applied at the rows of springs of the bedding, and including:
    (a) a frame with side rails and open therebetween;
    (b) a pressure applying support means comprising, a stiff, vertically shiftable and depressible header simulating the placement and disposition of a row of said bedding springs and guided by and between the side rails of the frame, and a row of spring coils supporting the header;
    (c) and indicative adjustment means comprising a vertically moveable platen lifted beneath the row of spring coils, varying the pressure of the spring coils so as to elevate the header and overlying area and body of a person reclining on the apparatus.

6. A bedding prescription apparatus for determination of support pressure to be applied at the rows of springs of the bedding, and including:
    (a) a frame with side rails and open therebetween;
    (b) a pressure applying support means comprising, a stiff, vertically shiftable and depressible header simulating the placement and disposition of a row of said bedding springs and guided by and between the side rails of the frame, and a row of spring coils supporting the header;
    (c) and indicative adjustment means to lift a vertically shiftable platen beneath the row of spring coils and comprising, a rotatable control shaft with a pair of spaced lifting cams engageable with the platen, and manually operable means to selectively position and releasably secure the control shaft in the rotated position required to set the pressure of the spring coils and elevate to the desired level the header and overlying area and body of a person reclining on the apparatus.

References Cited
UNITED STATES PATENTS

| | | | |
|---|---|---|---|
| 65,964 | 6/1867 | Thompson | 5—243 |
| 2,630,585 | 3/1953 | Reese | 5—248 |
| 3,059,249 | 10/1962 | Kamp | 5—246 |
| 3,126,554 | 3/1964 | Janapol | 5—243 |

DAVID J. WILLIAMOWSKY, *Primary Examiner.*

FRANK B. SHERRY, *Examiner.*

R. D. KRAUS, *Assistant Examiner.*